Jan. 14, 1964  S. F. HENRIKSSON ETAL  3,117,654
AUXILIARY BRAKE MECHANISM
Filed Dec. 22, 1961  5 Sheets-Sheet 3

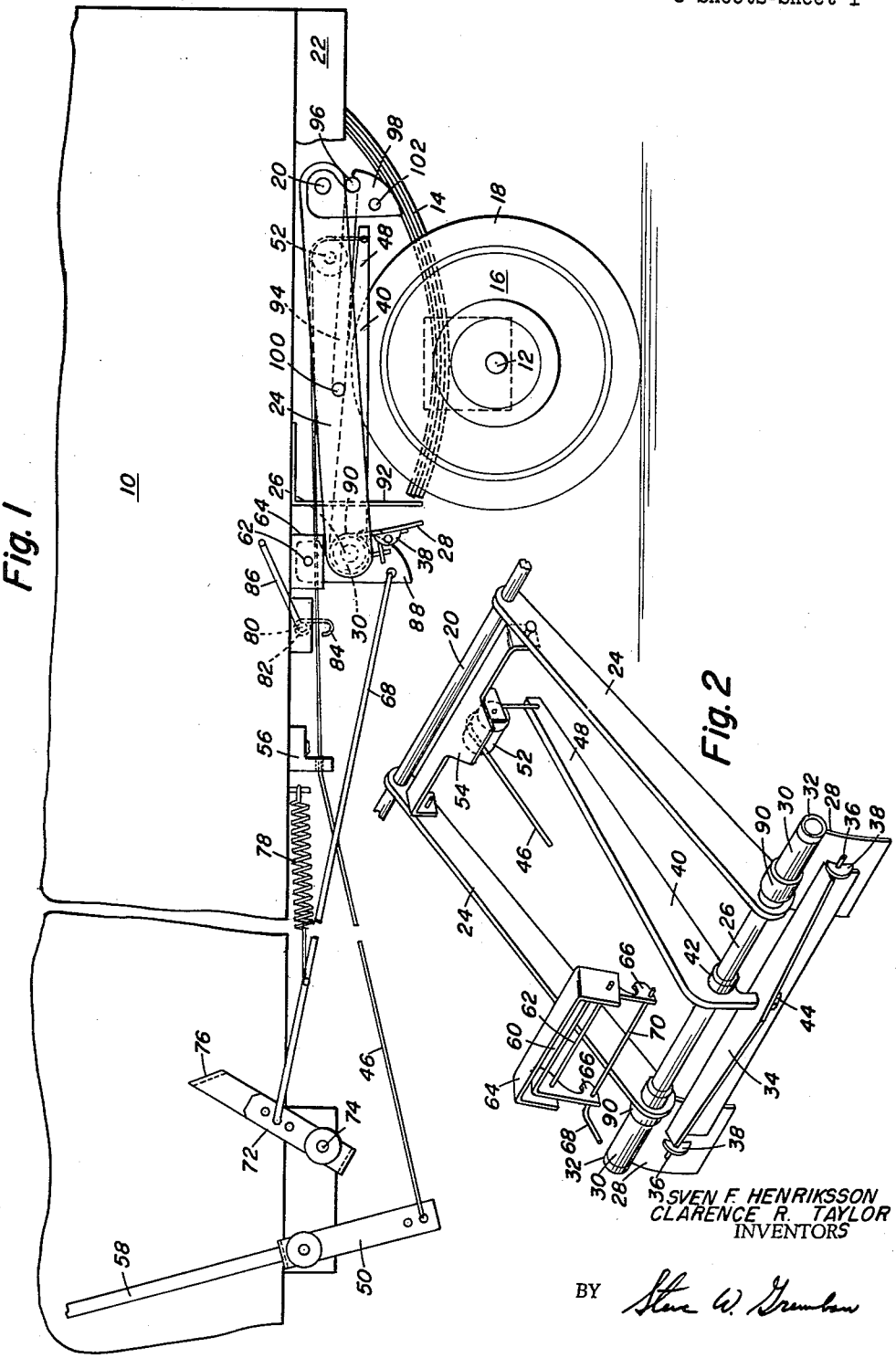

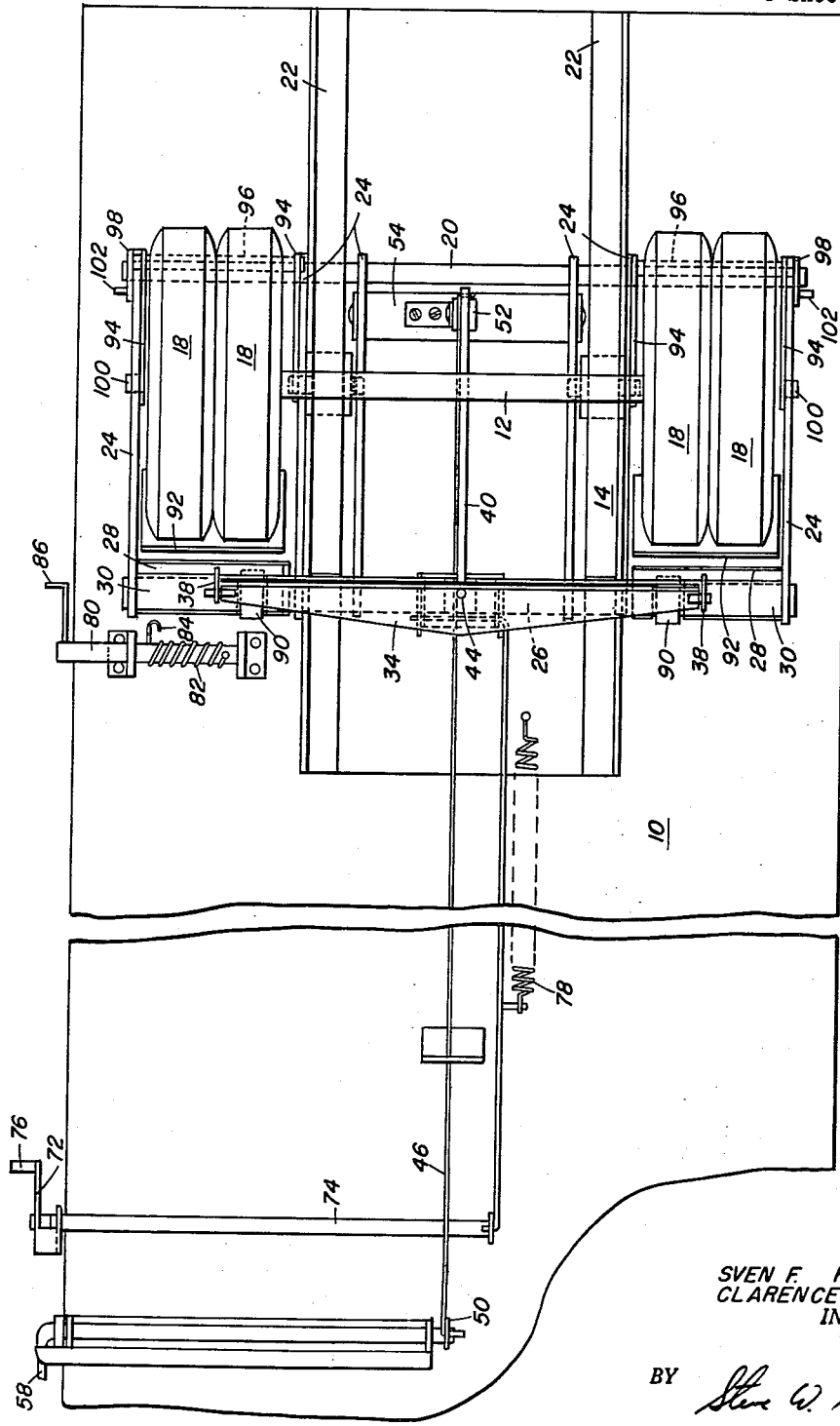

SVEN F. HENRIKSSON
CLARENCE R. TAYLOR
INVENTORS

BY *Steve W. Grenbow*

ATTORNEY

Jan. 14, 1964   S. F. HENRIKSSON ETAL   3,117,654
AUXILIARY BRAKE MECHANISM
Filed Dec. 22, 1961   5 Sheets-Sheet 4

SVEN F. HENRIKSSON
CLARENCE R. TAYLOR
INVENTORS

BY *Steve W. Grumbaw*

ATTORNEY

Jan. 14, 1964   S. F. HENRIKSSON ETAL   3,117,654
AUXILIARY BRAKE MECHANISM
Filed Dec. 22, 1961   5 Sheets-Sheet 5
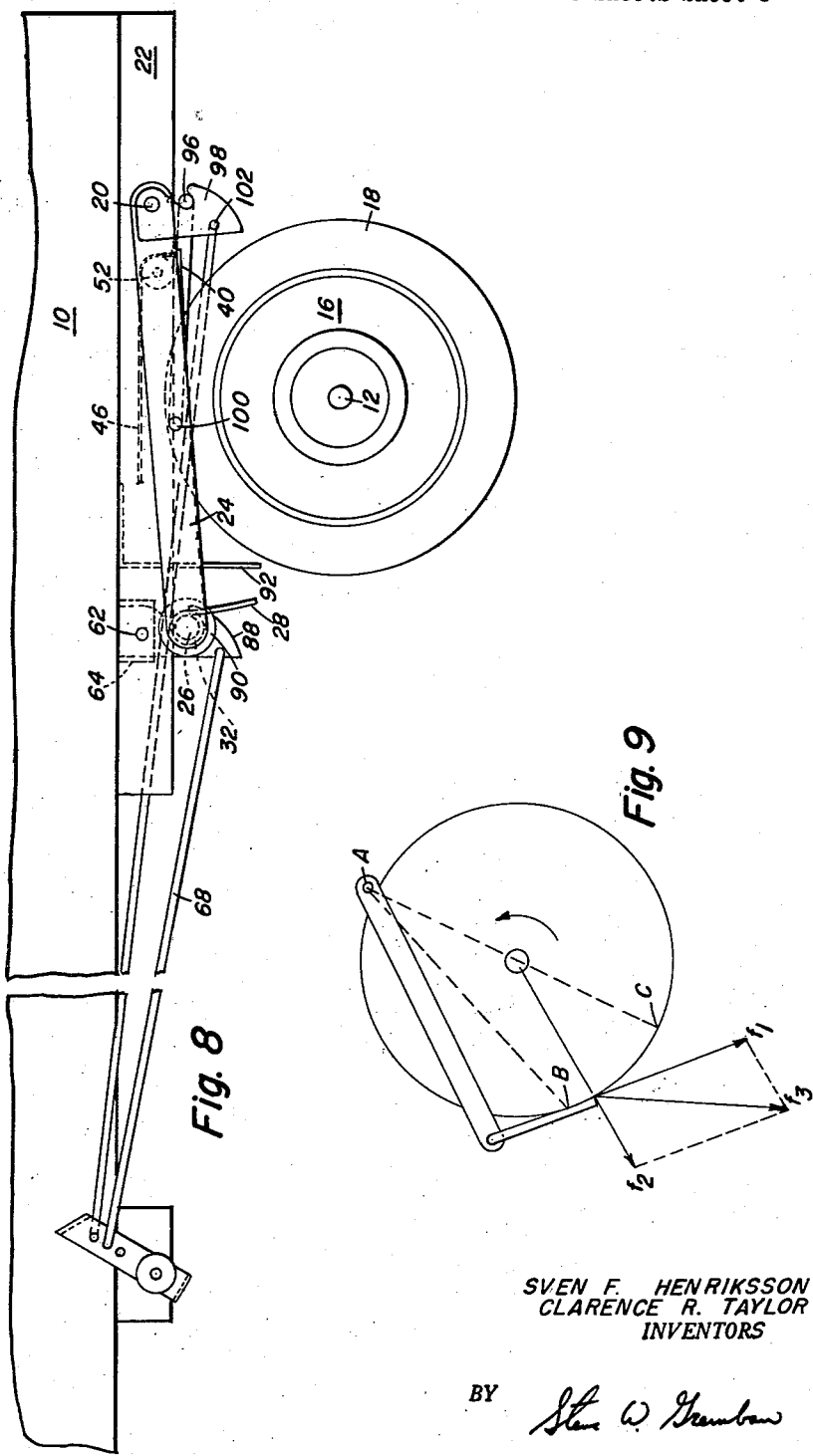
SVEN F. HENRIKSSON
CLARENCE R. TAYLOR
INVENTORS
BY
ATTORNEY United States Patent Office 3,117,654
Patented Jan. 14, 1964

3,117,654
AUXILIARY BRAKE MECHANISM
Sven F. Henriksson, 124 Woodbine Ave., East Rochester, N.Y., and Clarence R. Taylor, East Rochester, N.Y. (28 Woodside Drive, Penfield, N.Y.)
Filed Dec. 22, 1961, Ser. No. 161,637
20 Claims. (Cl. 188—29)

This invention relates generally to brake mechanisms, and more specifically to an auxiliary brake mechanism for a large vehicle, trailer or the like.

In the operation of large vehicles on the road, such as trailers and semi-trailers for hauling heavy loads, the normal brake system is subjected to severe wear. As a result, it is not unusual for the normal brake system to fail for one reason or another, with serious consequences, particularly when the vehicle is traveling on a descending road of steep grade and tortuous path. Applicants' invention, a preferred embodiment of which is disclosed hereinafter, relates to an emergency brake mechanism that may be used by the operator of the vehicle to prevent the vehicle from running away in the event of failure of its normal brake system. Runaway vehicles of this type have been known to cause injury to the operator and others, and the destruction of the vehicle itself and other property.

Therefore, it is one of the primary objects of the present invention to provide an emergency brake system for a vehicle which may be operative when the normal brake system fails or is inadequate.

Another object of this invention is to provide an emergency brake system for a vehicle in which the amount of braking force can be controlled by the operator.

An additional object of the invention is the provision of an auxiliary brake system for a vehicle for releasably holding the vehicle in a position of rest.

Still another object of the invention is to provide an emergency brake system for a vehicle or the like that will operate effectively in all weather conditions.

Another object of the invention is to provide an emergency brake system for a vehicle or the like that is of simple design and construction, thoroughly reliable and efficient in operation, and economical to manufacture.

A more specific object of the invention is to provide an auxiliary brake mechanism for a vehicle or the like having a brake shoe adapted to engage the periphery of a tire and to apply a braking force thereto controllable by the operator, and where the work involved in the braking action is supplied by the tire and mass of the vehicle so that the operator has to do very little work.

Objects and advantages other than those set forth above will be apparent from the following description when read in connection with the accompanying drawings, in which:

FIG. 1 is a segmental view of a vehicle incorporating a brake mechanism constructed in accordance with the present invention;

FIG. 2 is a segmental perspective view of the brake mechanism of FIG. 1 in an operative position with the rotatable member omitted for purposes of clarity;

FIG. 3 is a bottom view of the structure of FIG. 1;

FIG. 8 is a view similar to FIG. 1 showing a modification of the invention in which the brake mechanism is controlled by a single lever; and FIG. 9 is a force diagram of the brake mechanism.

Figure 4:
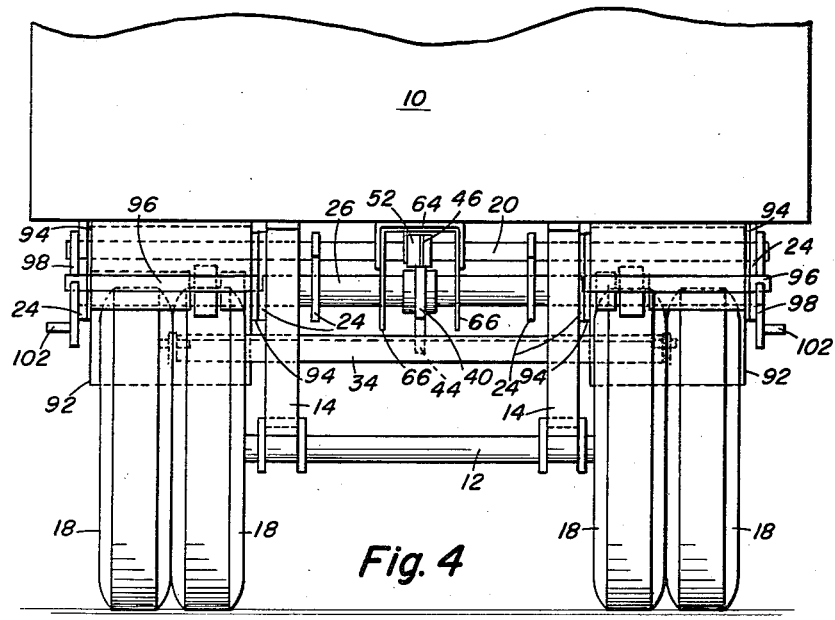
FIG. 4 is a rear elevation view of the structure of FIG. 1.
Figure 5:
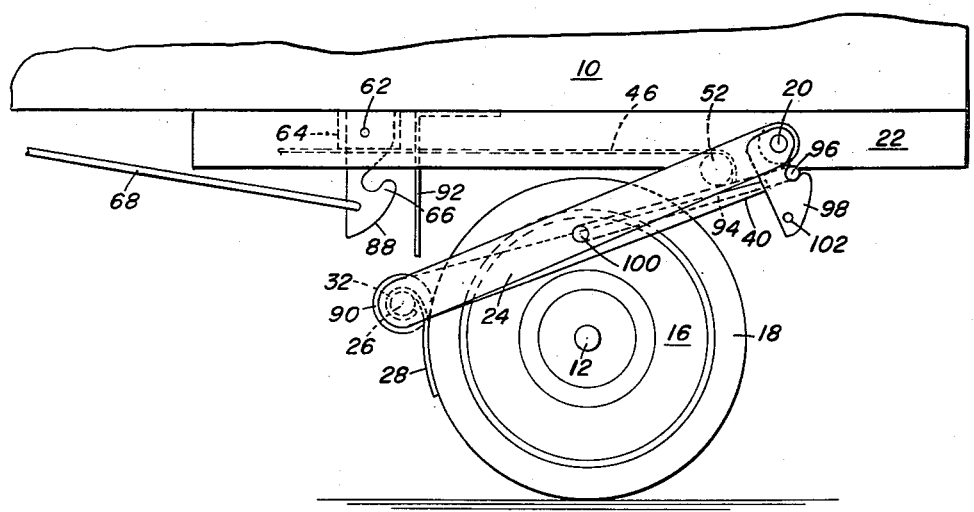
FIG. 5 is a segmental view of the structure of FIG. 1 showing the brake mechanism in an operative position with no braking force being applied to the vehicle.

As shown in the drawings, a preferred embodiment of the invention is incorporated in a vehicle having a body 10, an axle 12 secured to body 10 through a pair of leaf strings 14, and tandem wheels 16 rotatably mounted on the ends of axle 12 for supporting rubber tires 18 secured thereto as is well known in the art. By a vehicle, applicants mean any type of object mounted on rotatable wheels to which rubber tires are preferably secured. Examples of a vehicle of this type would be a tractor and trailer combination, semi-trailers, and large trucks designed to carry heavy loads. These vehicles are normally supplied with a conventional brake system such as air-brakes or the like.

The brake mechanism of this invention is primarily designed as an auxiliary or emergency brake system for use in a vehicle of the above-described type having a conventional brake system. This brake system is primarily designed for use in case of failure of the normal brake system of the vehicle, or in the event the normal brake system is inadequate. This brake mechanism comprises a spindle 20 rotatably journaled in brackets 22 secured to body 10, and having a plurality of arms 24 rigidly secured thereto, the opposite ends of arms 24 being rigidly secured to a shaft 26. Identical brake shoes 28 are pivotally mounted on each end of shaft 26, each brake shoe 28 comprising a metal plate, one end of which is turned substantially through 360° to form a sleeve 30 encircling shaft 26, and the remainder of shoe 28 being arcuately bent of a radius substantially equal to the radius of a corresponding tire 18. An annular flange 32 is mounted on each end of shaft 26 to form a stop or shoulder against which one side of each brake shoe 28 bears. Two of the arms 24 serve as shoulders on the opposite side of each shoe 28 to positively locate each brake shoe in a specified axial position in alignment with the tires 18 on the vehicle. Although the brake mechanism is shown in connection with two axially spaced apart wheels, it is, of course, apparent that it could be readily adapted to a single wheel.

The mechanism for urging the brake shoes 28 into engagement with the periphery of its complementary tires 18 comprises a cross-bar 34 of L-shaped cross-section having its ends 36 loosely extending through eyelets 38 rigidly secured to the back of each brake shoe 28. A lever 40 has a hub 42 encircling axle 26 for pivotal movement of lever 40 thereabout, and a short arm 44 extending from hub 42 substantially at right angles to lever 40 through a complementary opening in cross-bar 34 positioned midway between its ends. Hence, cross-bar 34 is pivotally mounted on arm 44 and serves to equalize the braking force applied to tires 18 by brake shoes 28. It is essential that the braking force applied to each tire 18 be equal in order to prevent the vehicle from veering to the side which is braked the greatest amount. The pivotal movement of cross-bar 34 further assures that each of the brake shoes 28 will engage the periphery of tires 18 and will allow for misalignment in the tires and tolerance in the parts. A flexible steel cable 46 has one end secured to end 48 of lever 40, the opposite end secured to one end of an operating lever 50 pivotally mounted on body 10, and the intermediate portion extending over a pulley 52 mounted on bracket 54 and through a guide member 56 secured to body 10. Bracket 54 is secured by screws to a pair of arms 24. The opposite end of lever 50 has a suitable foot pedal or hand grip 58 for operation by the operator.

The axle 26, arms 24, cross-bar 34, lever 40 and spindle 20 are pivotally movable as a unit with respect to support brackets 22 between a released or operative position and a latched or inoperative position. A latch for holding the unit in a latched position essentially comprises a U-shaped bracket 60 pivotally mounted on a stub shaft 62 journaled in a U-shaped housing 64 secured to body 10. The bracket 60 has hooks 66 adapted to egage axle 26 for releasably holding the axle in a latched position as seen in FIG. 1. A rigid rod 68 has a bent end 70 secured to bracket 60, and the opposite end secured to an operating lever 72 pivotally secured to body 10 at 74. This operating lever 72 is shown as having a foot pedal 76 which the operator may press to release the latch. It should be clearly understood that either of the operating levers 50, 72 may be mounted in the cab of the tractor or truck, and may be actuable by the operator's foot or mounted so as to be operatable by hand. A helical spring 78 has one end secured to rod 68 and the opposite end secured to bracket 22 for biasing the latch in its latched position. After the brake mechanism is released by the operator by depressing lever 72, the brake mechanism falls by gravity into its released position. In order to raise the brake mechanism back into its latched position, a winch is provided comprising a drum 80 rotatably supported by body 10 and having a flexible cable 82 wound thereon, one end of which is secured to drum 80 and the opposite end to a steel hook 84. In operation, cable 82 is unwound, hook 84 secured to the brake mechanism, and drum 80 turned by means of a crank 86 secured thereto for winding the cable 82 back around drum 80 and raising the brake mechanism therealong. The ends of the latching bracket 60 are beveled at 88, and the axle 26 cams bracket 60 out against the bias of spring 78, and after axle 26 passes the cammed surfaces 88, the latching bracket 60 moves inwardly, causing hooks 66 to move underneath axle 26 and hold the brake mechanism in the latched position.

Each of the brake shoes 28 has a cut-out portion intermediate its ends, and in the assembly of each brake shoe on axle 26, a roller 90 is positioned in the cut-out portion concentric with sleeve 30 and movable therewith onto axle 26. The diameter of roller 90 is greater than the diameter of sleeve 30, and hence its peripheral surface radially extends out from the axis of axle 26 a greater distance than the peripheral surface of sleeve 30. Consequently, when the brake mechanism is released, the brake mechanism drops by gravity until rollers 90 strike the periphery of tires 18 and effectively stops any further downward movement of the brake mechanism. This is the released or operative position of the brake mechanism, and in this position the rollers 90 bear against the periphery of tires 18 and are driven by the tires. In this position, the surface of each brake shoe 28 is in loose engagement with the periphery of tires 18 and no braking force is applied to the tires.

To prevent icing of brake shoes 28 when the brake mechanism is in the latched position, ice shields or flaps 92 which may be made of any suitable material, such as rubber, is secured to body 10 and is interposed between tires 18 and brake shoes 28 so that water or snow thrown by tires 18 is prevented from striking brake shoes 28 and accumulating thereon in the form of ice.

The brake mechanism described heretofore is used to apply braking force to tires 18 when the vehicle is moving in a forward direction. This brake mechanism is further provided with an additional brake device to prevent movement of the vehicle in a reverse direction such as might occur if the vehicle were parked on a slight incline and the normal brakes failed. This brake mechanism as best seen in FIGS. 3–7 simply comprises a pair of arms 94 having one end of each arm pivotally secured to arms 24 and the opposite ends connected by a cross-bar 96, the unit being movable between a latched position and a braking position. A latch for holding the brake mechanism in the latched position comprises a hook 98 pivotally about spindle 20 and adapted to engage one end of cross-bar 96. When the latch is released, the unit drops down by gravity causing the cross-bar 96 to engage the periphery of the tires 18. Any attempt by the tires 18 to turn in the reverse direction exerts a force on the cross-bar 96, by virtue of the fact that its distance from its pivot 100 is less than the distance from its pivot 100 to the periphery of the tires 18 taken along a line passing through the center of the tires, causing the cross-bars 96 to more tightly engage the tires as explained hereinafter. Consequently, a self-locking action results, and the harder the tires 18 attempt to turn in the reverse direction, the greater the braking force applied thereto. A spring, not shown, urges the latch in the latching position, and it is releasable by means of the operator grasping a handle 102 carried by the latch and manually urging the latch against the bias of the spring, and out of engagement with cross-bars 96.

Figure 6:
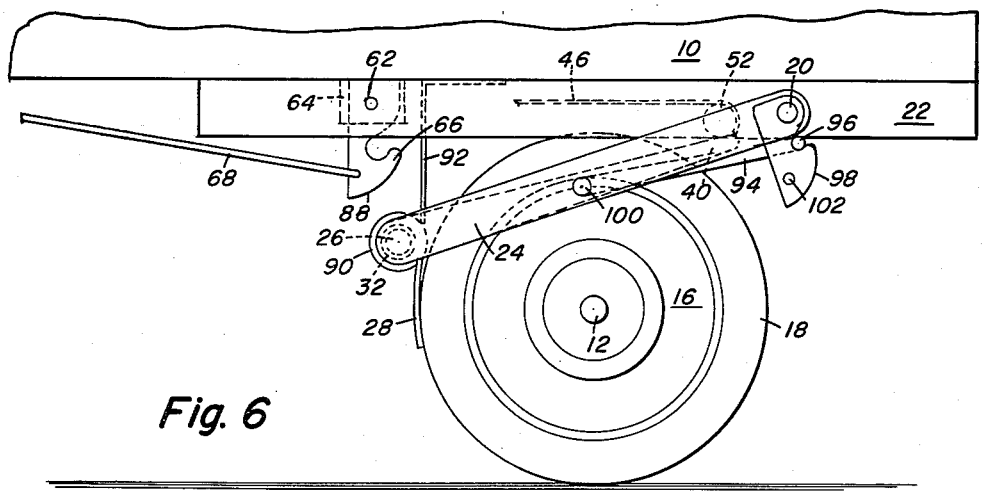
FIG. 6 is a view similar to FIG. 5 showing the brake mechanism in an operative position with the operator applying a braking force to the vehicle.
Figure 7:
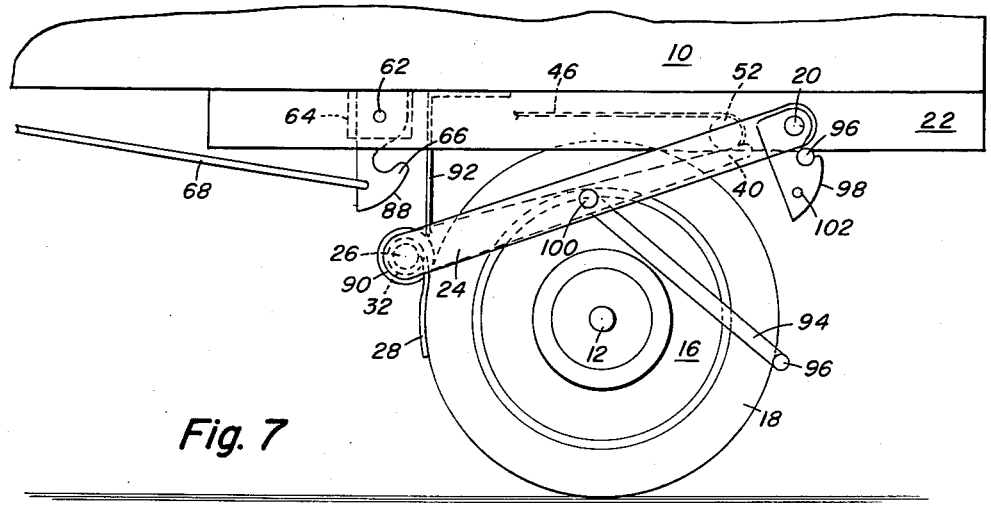
FIG. 7 is similar to FIG. 5 showing the brake mechanism in an operative position for applying a braking force to the vehicle no matter which direction the vehicle attempts to move.

In the operation of this invention, let us assume initially that the vehicle is traveling down a steeply inclined road and that the normal braking system for the vehicle has failed and the vehicle is beginning to gain speed. The operator would then immediately depress the foot lever 76 withdrawing latch 66 from axle 26, thereby releasing the brake mechanism which would fall by gravity from its latched position to its released or operative position in which rollers 90 engage the periphery of tires 18 and are rotatable thereby. In this position, the brake shoes 28 are in loose engagement with the periphery of the tires 18 and no braking force is applied thereto. The operator then pulls back on lever 58 causing cable 46 to pivotally move lever 40 about shaft 26 in a counterclockwise direction causing arm 44 to move cross-bar 34 toward tires 18. The length of lever 40 is considerably greater than the length of arm 44 to provide a substantial mechanical advantage so that the force applied by the operator to the end 48 of lever 40 is considerably smaller than the force applied to cross-bar 34. Inward movement of cross-bar 34 causes the rollers 90 to momentarily withdraw from tires 18 as seen in FIG. 6, and the brake shoes 28 to move into braking engagement with the periphery of tires 18. The force component applied to each brake shoe 28 by tire 18 has a small component tending to move brake shoe 28 away from the periphery of tire 18, and a large component tending to move brake shoe 28 into tighter engagement with the periphery of tire 18. Since the distance from point A to B as seen in FIG. 9, which is the effective distance between the pivot and the brake shoe contact point, is shorter than the distance from point A to C, which is the effective distance between the pivot and the periphery of tire 18 taken along a line extending through the center of wheel 16, it is clear that the forces $f_1$, $f_2$ and resultant force $f_3$ exerted on brake shoe 28 by tire 18 when rotated in the direction of the arrow would tend to move brake shoe 28 into tighter engagement with the periphery of tire 18 thereby increasing the braking force applied thereto. If this braking force should become too great, the operator merely reduces the pressure applied to lever 58 permitting the force component to urge brake shoe 28 out of engagement with the periphery of tire 18, and hence reduce the braking force.

The invention has been described in detail with particular reference to a preferred embodiment thereof, but it will be understood that variations and modifications can be effected in the scope of the invention as described hereinabove and as defined in the appended claims.

We claim:

1. In a brake mechanism for a rotatable member, the combination comprising:
   pivotal means movable between an inoperative position, in which said pivotal means is out of engagement with said rotatable member, and an operative position, in which a portion of said pivotal means is in engagement with said rotatable member;
   a brake member independent of said portion and carried by said pivotal means and movable relative to said pivotal means while said portion is in engagement with said rotatable member between a braking position, in which said brake member is in frictional braking engagement with said rotatable member, and a non-braking position, in which said brake member is in loose engagement with said rotatable member and does not apply any appreciable braking force thereto; and manually operated means carried by and movable relative to said pivotal means for moving said brake member between said braking and non-braking positions, and further for adjustably controlling the amount of frictional braking force exerted against said rotatable member by said brake member in its braking position.

2. The invention according to claim 1 wherein said brake member is pivotal, and said last recited means comprises a pivotal lever having one end connected to said brake member and the opposite end manually controlled.

3. The invention according to claim 2 wherein said brake member and said lever have the same pivot.

4. The invention according to claim 1 wherein said pivotal means comprises a plurality of arms pivoted at one end and having a shaft secured to their opposite ends; said brake member is pivoted on said shaft; and said last recited means comprises a lever pivoted on said shaft and having one end connected to said brake member and its opposite end manually controlled.

5. The invention according to claim 4 wherein said last recited means further comprises a roller; a manually operated element; and a cable movable on said roller and having one end connected to said opposite end of said lever, and its opposite end connected to said element.

6. The invention according to claim 1 wherein said pivotal means includes an arcuately shaped member adapted to engage said rotatable member.

7. The invention according to claim 6 wherein said arcuately shaped member is a roller.

8. The invention according to claim 1 wherein said pivotal means comprises a plurality of arms pivoted at one end and having a shaft secured to their opposite ends, and a first roller rotatably mounted on said shaft and adapted to engage the periphery of said rotatable member; said brake member is pivoted on said shaft; and said last recited means comprises a lever pivoted on said shaft and having one end connected to said brake member and its opposite end manually controlled.

9. The invention according to claim 8 wherein said last recited means further comprises a second roller; a manually operated element; and a cable movable on said second roller and having one end connected to said opposite end of said lever, and its opposite end connected to said element.

10. The invention according to claim 1 wherein said pivotal means are movable between inoperative and operative positions, and a latch releasably holds said pivotal means in its inoperative position.

11. The invention according to claim 1 wherein said pivotal means supports a second pivotal brake member which is movable relative thereto in a direction opposite to said one direction into engagement with said rotatable member to prevent rotation of said rotatable member in a direction of rotation opposite to said one direction.

12. In a brake mechanism for spaced apart rotatable members, the combination comprising:

pivotal means movable in one direction of rotation into an operative position in engagement with said rotatable members which are movable in said one direction;

spaced-apart brake members carried by said pivotal means and movable relative thereto into engagement with a corresponding rotatable member when said pivotal means is in said operative position;

a cross-bar interconnecting said brake members; and manually operated means including a pivot connected to said cross-bar for moving said cross-bar to urge said brake members into engagement with said rotatable members, and further for adjustably controlling the amount of force exerted thereagainst by said brake members.

13. The invention according to claim 12 wherein said brake members are pivotal, and said last recited means comprises a pivotal lever having one end connected to said cross-bar and the opposite end manually controlled.

14. The invention according to claim 13 wherein said brake members and said lever have the same pivot.

15. The invention according to claim 12 wherein said pivotal means comprises a plurality of arms pivoted at one end and having a shaft secured to their opposite ends; said brake members are pivoted on said shaft; and said last recited means comprises a lever pivoted on said shaft and having one end connected to said cross-bar and its opposite end manually controlled.

16. The invention according to claim 15 wherein said last recited means further comprises a roller; a manually operated element; and a cable movable on said roller and having one end connected to said opposite end of said lever, and its opposite end connected to said element.

17. The invention according to claim 12 wherein said pivotal means includes spaced arcuately shaped members adapted to engage corresponding rotatable members.

18. The invention according to claim 17 wherein said arcuately shaped members are rollers.

19. The invention according to claim 12 wherein said pivotal means are movable between inoperative and operative positions, and a latch releasably holds said pivotal means in its inoperative position.

20. In a brake mechanism for a rotatable member, the combination comprising:

support means movable between an inoperative position, in which said support means is out of engagement with said rotatable member, and an operative position, in which a portion of said support means is in engagement with said rotatable member;

a brake member independent of said portion and carried by said support means and movable relative to said support means while said portion is in engagement with said rotatable member between a braking position, in which said brake member is in frictional braking engagement with said rotatable member, and a non-braking position, in which said brake member is in loose engagement with said rotatable member and does not apply any appreciable braking force thereto; and manually operated means carried by and movable relative to said support means for moving said brake member between said braking and non-braking positions, and further for adjustably controlling the amount of frictional braking force exerted against said rotatable member by said brake member in its braking position.

References Cited in the file of this patent

UNITED STATES PATENTS

| | | |
|---|---|---|
| 2,738,034 | Levine | Mar. 13, 1956 |
| 2,780,322 | Hickle | Feb. 5, 1957 |